(12) United States Patent
Zhang et al.

(10) Patent No.: US 10,685,188 B1
(45) Date of Patent: Jun. 16, 2020

(54) SYSTEMS AND METHODS FOR TRAINING MACHINE LEARNING MODELS FOR LANGUAGE CLUSTERS

(71) Applicant: Facebook, Inc., Menlo Park, CA (US)

(72) Inventors: Ying Zhang, Palo Alto, CA (US); Arun Babu, Mountain View, CA (US); James Li, Pleasanton, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/029,296

(22) Filed: Jul. 6, 2018

(51) Int. Cl.
*G06F 17/28* (2006.01)
*G06F 40/47* (2020.01)
*G06N 20/00* (2019.01)
*G06F 40/30* (2020.01)
*G06F 40/51* (2020.01)
*G06F 40/263* (2020.01)

(52) U.S. Cl.
CPC ............ *G06F 40/47* (2020.01); *G06F 40/263* (2020.01); *G06F 40/30* (2020.01); *G06F 40/51* (2020.01); *G06N 20/00* (2019.01)

(58) Field of Classification Search
CPC ............... G06F 17/2785; G06F 17/279; G06F 17/2765; G06F 17/277; G06F 17/27; G06F 17/2735; G06F 17/274; G06F 17/275; G06F 17/2745; G06F 17/2755; G06F 17/276; G06F 17/2775; G06F 17/278; G06F 17/2795; G06F 17/2885; G06F 27/279; G06F 17/28; G06F 17/2809; G06F 17/2827; G06F 17/2836; G06F 17/2854; G06F 17/2872; G06F 17/2881; G06F 17/289; G06F 17/218; G06F 17/2247; G06F 17/272; G06N 20/00
USPC .............. 704/1–10, 275, E15.014, 231, 232, 704/E15.003, E15.018, E15.019, E13.012
See application file for complete search history.

(56) References Cited

U.S. PATENT DOCUMENTS

2007/0219779 A1* 9/2007 Kojima ............... G06F 17/2785
   704/9
2015/0161227 A1* 6/2015 Buryak .................. G06F 9/454
   707/738
2017/0185583 A1* 6/2017 Pino ..................... G06F 17/2735

OTHER PUBLICATIONS

Koehn, Philipp, "Machine Translation for all European Languages," European Commission EuroMatrix Project, Sep. 13, 2007 [accessed online at http://www.mt-archive.info/MTS-2007-Koehn-1.pdf on Oct. 2, 2018].

* cited by examiner

*Primary Examiner* — Leshui Zhang
(74) *Attorney, Agent, or Firm* — Sheppard Mullin Richter & Hampton LLP

(57) ABSTRACT

Systems, methods, and non-transitory computer readable media can generate a plurality of language clusters based on one or more of: language similarity between languages or social behavior similarity between languages. A representative language for a language cluster of the plurality of language clusters can be determined. For the language cluster of the plurality of language clusters, a machine learning model can be trained based on the representative language for the language cluster to classify content items in languages included in the language cluster.

20 Claims, 8 Drawing Sheets

400

Generate a plurality of language clusters based on one or more of: language similarity between languages or social behavior similarity between languages
402

Determine a representative language for a language cluster of the plurality of language clusters
404

Train, for the language cluster of the plurality of language clusters, a machine learning model based on the representative language for the language cluster to classify content items in languages included in the language cluster
406

Obtain a content item in a language associated with a language cluster of a plurality of language clusters, wherein the language is not a representative language of the language cluster
502

Determine a classification for the content item based on a machine learning model for the language cluster
504

SYSTEMS AND METHODS FOR TRAINING MACHINE LEARNING MODELS FOR LANGUAGE CLUSTERS

FIELD OF THE INVENTION

The present technology relates to the field of social networks. More particularly, the present technology relates to techniques for training machine learning models associated with social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system may provide resources through which users may publish content items. In one example, a content item can be presented on a profile page of a user. As another example, a content item can be presented through a feed for a user to access. Users may provide feedback associated with a content item, for example, through comments, reactions, etc.

SUMMARY

Various embodiments of the present technology can include systems, methods, and non-transitory computer readable media configured to generate a plurality of language clusters based on one or more of: language similarity between languages or social behavior similarity between languages. A representative language for a language cluster of the plurality of language clusters can be determined. For the language cluster of the plurality of language clusters, a machine learning model can be trained based on the representative language for the language cluster to classify content items in languages included in the language cluster.

In some embodiments, the generating a plurality of language clusters includes determining language similarity between at least a first language and a second language based on a quality of machine translation between the first language to the second language.

In certain embodiments, the quality of the machine translation is indicated by a score based on a comparison of the machine translation to one or more human reference translations.

In an embodiment, the generating a plurality of language clusters includes determining social behavior similarity between at least a first language and a second language based on one or more features relating to user interactions with content items in the first language and one or more features relating to user interactions with content items in the second language.

In some embodiments, the determining the social behavior similarity between at least the first language and the second language includes embedding a feature vector including the one or more features for the first language and a feature vector including the one or more features for the second language in a feature space corresponding to the one or more features.

In certain embodiments, the one or more features for the first language and the one or more features for the second language include one or more of: a number of comments, a number of reactions, a comment through rate, a reaction through rate, or comment entropy.

In an embodiment, the generating a plurality of language clusters includes determining the plurality of language clusters based on a combination of language similarity between at least a first language and a second language and social behavior similarity between at least the first language and the second language.

In some embodiments, the generating a plurality of language clusters includes embedding a feature vector for a first language and a feature vector for a second language in a corresponding feature space, the feature vector for the first language and the feature vector for the second language including one or more features relating to the language similarity between languages and the social behavior similarity between languages.

In certain embodiments, training data for training the machine learning model includes a plurality of content items in the representative language and classifications associated with the plurality of content items.

In an embodiment, a content item in a language associated with the language cluster of the plurality of language clusters can be obtained, wherein the language is not the representative language, and a classification for the content item can be determined based on the machine learning model for the language cluster.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

BRIEF DESCRIPTION OF THE DRAWINGS

FIG. 4 illustrates an example first method for training machine learning models for language clusters, according to an embodiment of the present technology.

Figure 1:
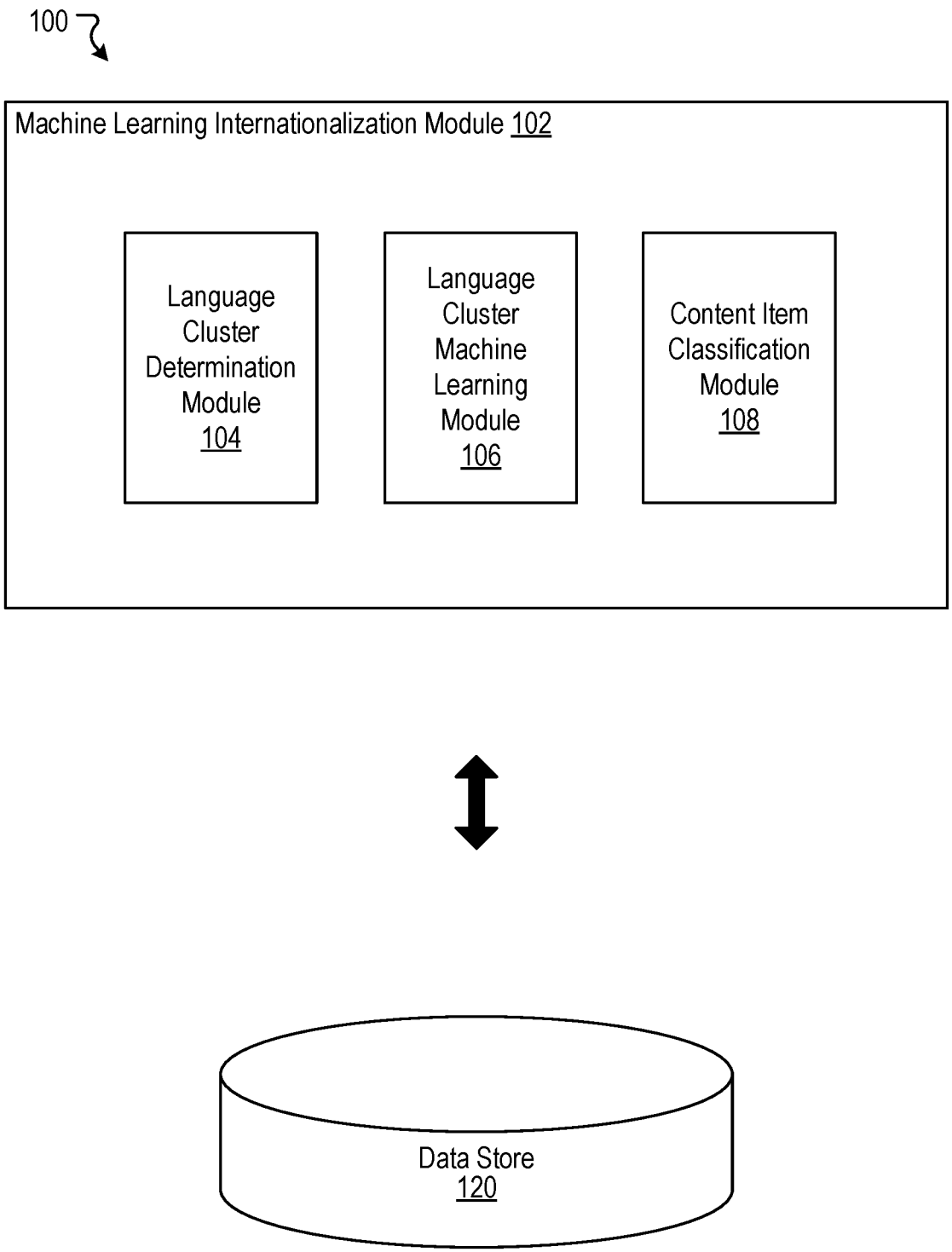
FIG. 1 illustrates an example system including an example machine learning internationalization module configured to train machine learning models for language clusters, according to an embodiment of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Training Machine Learning Models for Language Clusters

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide resources through which users may publish content items. In one example, a content item can be presented on a profile page of a user. As another example, a content item can be presented through a feed for a user to access. Users may provide feedback associated with a content item, for example, through comments, reactions, etc.

Conventional approaches specifically arising in the realm of computer technology can classify content items based on various attributes. For example, content items can be classified as a particular type of content item. Content items may be in different languages. In some cases, conventional approaches may train a machine learning model to classify content items in multiple languages. However, the machine learning model may not be able to accurately classify content items for all of the multiple languages since different languages can have structural differences, cultural differences, and other unique or nuanced attributes. In other cases, conventional approaches can train a separate machine learning model for a particular language to classify content items in that language. For example, a machine learning model for a particular language can be trained based on training data in that language. However, training separate machine learning models for different languages can be inefficient and require a significant amount of computing resources, especially if machine learning models need to be trained for a large number of languages.

An improved approach rooted in computer technology can overcome the foregoing and other disadvantages associated with conventional approaches specifically arising in the realm of computer technology. Based on computer technology, the present technology can train machine learning models to classify content items based on language clusters. For example, the present technology can determine clusters of languages based on various factors. Examples of factors can include language similarity and social behavior similarity. For example, language similarity between a first language and a second language can be determined based on the quality of machine translation from the first language to the second language, or the quality of the machine translation from the second language to the first language. As another example, social behavior similarity between a first language and a second language can be determined based on user behavior or interactions in connection with content items in the first language and the second language. For each language cluster, a representative language can be identified. The present technology can train a machine learning model for each language cluster based on the representative language. For example, training data can be prepared in the representative language for a language cluster, and the machine learning model for the language cluster can be trained based on the training data in the representative language. The present technology can then classify content items in languages in the language cluster other than the representative language based on the machine learning model for the language cluster. In this manner, the present technology can reduce the number of machine learning models that need to be generated for different languages and can also optimize machine learning for similar languages. Additional details relating to the present technology are provided below.

FIG. 1 illustrates an example system 100 including an example machine learning internationalization module 102 configured to train machine learning models for language clusters, according to an embodiment of the present technology. The machine learning internationalization module 102 can train one or more machine learning models to classify content items in different languages. A content item can include any type of content. For example, a content item can include text, an image, a video, audio, a combination thereof, etc. In some embodiments, a content item can be a post associated with a social networking system. A user may create a comment in response to a content item or select a sentiment reaction in response to a content item. A sentiment reaction may also be referred to as a "reaction." The machine learning internationalization module 102 can train a machine learning model to determine one or more classifications for content items in languages associated with a particular language cluster. For example, a classification can be associated with a particular type of content item. Accordingly, the machine learning internationalization module 102 can train one or more machine learning models to classify various types of content items.

The machine learning internationalization module 102 achieves significant advantages by using a representative language of a language cluster to train a machine learning model to classify content items in different languages in the language cluster. By selecting a representative language of a language cluster and training a machine learning model for the language cluster based on the representative language, the machine learning internationalization module 102 can realize more accurate classification results than using one language to train a machine learning model based on only one language (e.g., English). In addition, by training a machine learning model in relation to a representative language, the need to train and deploy machine learning models for other languages in the language cluster can be eliminated. In this way, the present technology can reduce the required number of machine learning models, leading to increased computing efficiency with modest impact, if any, on classification accuracy. Further, focus on a representative language facilitates acquisition and preparation of training data and related labeling. In addition, the machine learning internationalization module 102 can generate a machine learning model that is optimized for a particular language cluster, such as a neural network exhibiting shared or common neural network architectures and parameters (e.g., a window size, a number of layers, etc.) for the different languages in the language cluster.

The machine learning internationalization module 102 can include a language cluster determination module 104, a language cluster machine learning module 106, and a content item classification module 108. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the machine learning internationalization module 102 can be implemented in any suitable combinations. While the present technology is described in connection with content items associated with a social networking system for illustrative purposes, the present technology can apply to any other type of system and/or content.

The language cluster determination module 104 can determine clusters of languages. For example, the language cluster determination module 104 can determine language clusters based on language similarity between languages and social behavior similarity between languages. A representative language can be identified for each language cluster. Functionality of the language cluster determination module 104 is described in more detail herein.

The language cluster machine learning module 106 can train machine learning models for language clusters. For example, the language cluster machine learning module 106 can train a machine learning model for each language cluster to classify content items in languages associated with that language cluster. The machine learning model for each language cluster can be trained based on training data in the representative language for that language cluster. The language cluster machine learning module 106 can leverage machine learning from the machine learning model trained based on the representative language to classify content items in other languages associated with the language cluster. Functionality of the language cluster machine learning module 106 is described in more detail herein.

The content item classification module 108 can determine classifications for content items in different languages. For example, the content item classification module 108 can determine a classification for a content item in a particular language based on a machine learning model for a language cluster with which the particular language is associated. A classification can indicate whether a content item is associated with a particular type of content item, and the content item classification module 108 can classify whether a content item in a particular language is a particular type of content item. Examples of types of content items can include engagement bait, click bait, etc. As discussed herein, "engagement bait" may indicate a content item that attempts to influence users to engage with the content item in a way that is not typical or not desired. For instance, engagement bait can include a poll, a sweepstake, a contest, etc. As an example, engagement bait may include a question and ask a user to respond with different letters (e.g., "A," "B," "C," etc.) to the question. As discussed herein, "click bait" may indicate a content item that attempts to entice users to click on the content item or a link included in the content item. For instance, click bait can withhold information to entice a user to click or select a content item or a link included in a content item to obtain the withheld information. Many variations are possible.

In some embodiments, the machine learning internationalization module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the machine learning internationalization module 102 can be, in part or in whole, implemented as software running on one or more computing devices or systems, such as on a server system or a client computing device. In some instances, the machine learning internationalization module 102 can be, in part or in whole, implemented within or configured to operate in conjunction or be integrated with a social networking system (or service), such as a social networking system 630 of FIG. 6. Likewise, in some instances, the machine learning internationalization module 102 can be, in part or in whole, implemented within or configured to operate in conjunction or be integrated with a client computing device, such as the user device 610 of FIG. 6. For example, the machine learning internationalization module 102 can be implemented as or within a dedicated application (e.g., app), a program, or an applet running on a user computing device or client computing system. The application incorporating or implementing instructions for performing functionality of the machine learning internationalization module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The data store 120 can be configured to store and maintain various types of data, such as the data relating to support of and operation of the machine learning internationalization module 102. The data maintained by the data store 120 can include, for example, information relating to machine learning models, languages, language clusters, language similarity, social behavior similarity, training data, content items, classifications, labels, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the machine learning internationalization module 102 can be configured to communicate and/or operate with the data store 120. In some embodiments, the data store 120 can be a data store within a client computing device. In some embodiments, the data store 120 can be a data store of a server system in communication with the client computing device.

Figure 2A:
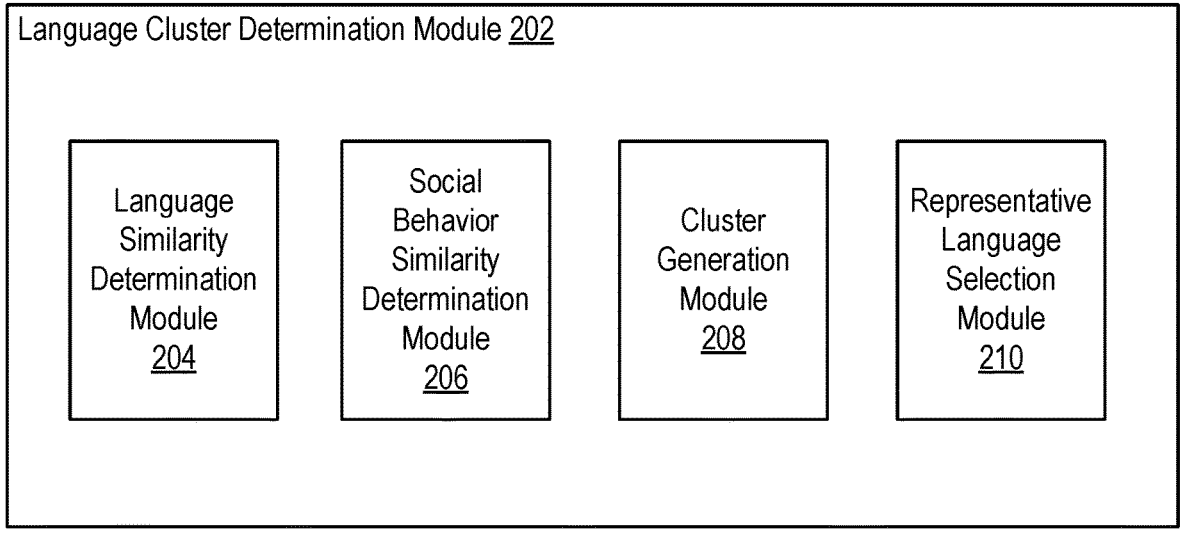
FIG. 2A illustrates an example language cluster determination module configured to determine language clusters, according to an embodiment of the present technology.

FIG. 2A illustrates an example language cluster determination module 202 configured to determine language clusters, according to an embodiment of the present technology.

In some embodiments, the language cluster determination module 104 of FIG. 1 can be implemented with the example language cluster determination module 202. As shown in the example of FIG. 2A, the example language cluster determination module 202 can include a language similarity determination module 204, a social behavior similarity determination module 206, a cluster generation module 208, and a representative language selection module 210.

The language similarity determination module 204 can determine similarity between languages. Language similarity can be determined based on various factors. Examples of factors for determining language similarity between two or more languages can include linguistic characteristics, grammar, syntax, word order, morphology, language origin, language family, alphabet, characters, etc. In some embodiments, the language similarity determination module 204 can determine similarity between languages based on a quality of machine translation between languages. For example, the quality of a machine translation of an expression in a first language into a second language can be determined based on comparison of the machine translation of the expression to one or more human reference translations for the same expression. Examples of an expression can include a word(s), a phrase(s), a sentence(s), etc. As an example, the quality of machine translation can be determined based on n-gram similarity between a machine translation of an expression and a human reference translation of the expression. An n-gram can indicate a contiguous sequence of n items from a given sample of text or speech. Examples of items can include phonemes, syllables, letters, words, base pairs, etc.

The language similarity determination module 204 can determine a score indicative of the quality of machine translation between two languages. For example, a score can indicate the quality of machine translation from a first language to a second language or between a first language and a second language. In some embodiments, a score between two languages can be directional. The quality of machine translation from the first language to the second language can be different from the quality of machine translation from the second language to the first language. In these embodiments, a first score can be determined for machine translation from the first language to the second language, and a second score can be determined for machine translation from the second language to the first language. For instance, a first score and a second score can be determined for different pairs of languages, and can be included in or organized as a chart or a matrix. As an example, the chart or the matrix can be the same as or similar to a language matrix in the EuroMatrix project by Philipp Koehn (http://www.mt-archive.info/MTS-2007-Koehn-1.pdf), which is incorporated herein by reference. In these embodiments, a score indicative of the quality of machine translation between the first language and the second language can be determined as an average of the first score and the second score. The score for the machine translation between two languages can be considered to indicate similarity between the two languages, for example, in connection with machine translation. For instance, the two languages may be considered to be similar if the score satisfies a threshold value, and the two languages can be considered not to be similar if the score does not satisfy the threshold value. In some embodiments, the language similarity determination module 204 can convert the score for the machine translation between two languages to a distance indicative of similarity between the two languages. A respective distance indicative of similarity between languages can be determined for different pairs of languages. One or more language clusters may be generated based on the respective distances between the different languages.

The social behavior similarity determination module 206 can determine similarity between social behavior of users in connection with content items in different languages. In some cases, user interactions and/or behavior in connection with content items in different languages can be similar in general, regardless of specific content of the content items. For example, users may interact with content items in some languages in a similar manner although the languages may not be linguistically similar. As an example, users interacting with content items in a first language may create comments or select reactions in a similar manner as users interacting with content items in a second language. Accordingly, the social behavior similarity determination module 206 can determine user interactions with content items for each language. For example, user interactions with content items for each language can be represented as one or more features, as described below. The social behavior similarity determination module 206 can compare the user interactions for different languages to determine which languages are similar in terms of social behavior.

The social behavior similarity determination module 206 can represent user interactions with content items as one or more features. For instance, one or more features representing user interactions with content items can be included in a feature vector. Examples of features for user interactions with a content item can include a number of comments, a number of reactions, a comment through rate, a reaction through rate, comment entropy, a ratio of any combination thereof, etc. A number of comments can indicate a number of comments by users in response to a content item. A number of reactions can indicate a number of reactions by users in response to a content item. A comment through rate can indicate a rate at which users create comments in response to a content item. A reaction through rate can indicate a rate at which users select a reaction in response to a content item. Comment entropy can indicate a measure of similarity among comments in response to a content item. As an example, a count of each unique word included in comments for a content item can constitute a comment entropy for the content item. In some embodiments, a content item can include a link, such as Uniform Resource Locators (URLs), and user interactions can be actions taken in connection with the link.

For each language, the social behavior similarity determination module 206 can determine user interactions with content items in that language. For example, the social behavior similarity determination module 206 can obtain features for all content items in a particular language and determine average values of the features. Each language can be represented by a feature vector that includes the average values of the features for that language. The feature vector for each language can be used to determine language clusters, for example, by the cluster generation module 208 as described below. In some embodiments, feature vectors for languages can be plotted or embedded in a feature space in order to determine language clusters based on social behavior similarity. For example, languages associated within the same language cluster can be considered to satisfy a threshold level of social behavior similarity with respect to one another.

The cluster generation module 208 can determine one or more clusters of languages. For instance, the cluster generation module 208 can determine clusters of languages based on language similarity and social behavior similarity.

For example, language similarity can be determined by the language similarity determination module 204 as described above. Social behavior similarity can be determined by the social behavior similarity determination module 206 as described above. In some embodiments, the cluster generation module 208 can determine language clusters based on a combination of language similarity and social behavior similarity. Many variations are possible. In certain embodiments, the cluster generation module 208 can determine language clusters based only on language similarity or based only on social behavior similarity.

In some embodiments, the cluster generation module 208 can determine aggregate language clusters based on component language clusters identified based on language similarity and component language clusters identified based on social behavior similarity, respectively. For example, the cluster generation module 208 can determine a first set of language clusters based on language similarity, for example, as determined by the language similarity module 204. The cluster generation module 208 can then determine a second set of language clusters based on social behavior similarity, for example, as determined by the social behavior similarity module 206. For a particular language, the cluster generation module 208 can determine a first distance from the particular language to another language in relation to the first set of language clusters and a second distance from the particular language to the other language in relation to the second set of language clusters. Then, the cluster generation module 208 can determine a linear combination of the first distance and the second distance in order to determine an overall distance from the particular language to the other language. The value of the linear combination can represent an extent to which the particular language and the other language are similar. In this manner, the cluster generation module 208 can determine respective overall distances of the particular language to different languages and identify a closest language for the particular language in distance based on the respective overall distances. For example, the cluster generation module 208 may determine an overall distance from the particular language to one or more other languages included in the same cluster in the first set of language clusters and/or one or more other languages included in the same cluster in the second set of language clusters. The particular language can be associated with the closest language identified in this manner. For example, the particular language can be included in the same cluster as the closest language for the particular language. Many variations are possible.

In some embodiments, the cluster generation module 208 can plot or embed feature vectors in a feature space in order to determine language clusters. For instance, each language can be represented as a feature vector that includes n features, and the feature vectors for different languages can be plotted in an n-dimensional feature space to determine language clusters. In certain embodiments, the feature vector for each language can include features relating to social behavior as well as features relating to language similarity. As an example, scores indicative of the quality of machine translation between two languages can be represented as one or more features in the feature vector. The cluster generation module 208 can generate one or more clusters based on the plotted feature vectors. Any generally known approach for clustering data can be used, such as k-means clustering. In general, the number of clusters generated by the cluster generation module 208 can vary depending on the implementation. In some cases, feature vectors can be reduced before they are plotted in an associated reduced feature space. In some embodiments, the cluster generation module 208 can determine weights associated with the features for the content items in different languages based on dimensionality reduction techniques, such as t-distributed stochastic neighbor embedding (t-SNE).

The representative language selection module 210 can determine a representative language for a language cluster. A language cluster can include multiple languages, and a representative language for the language cluster can be considered to represent or be characteristic of other languages in the language cluster. For example, the representative language selection module 210 can select the centroid of a language cluster as the representative language for the language cluster. The representative language can be used to train a machine learning model to classify content items for the language cluster, as described below. For example, training data for training the machine learning model for the language cluster can be in the representative language. All examples herein are provided for illustrative purposes, and there can be many variations and other possibilities.

Figure 2B:
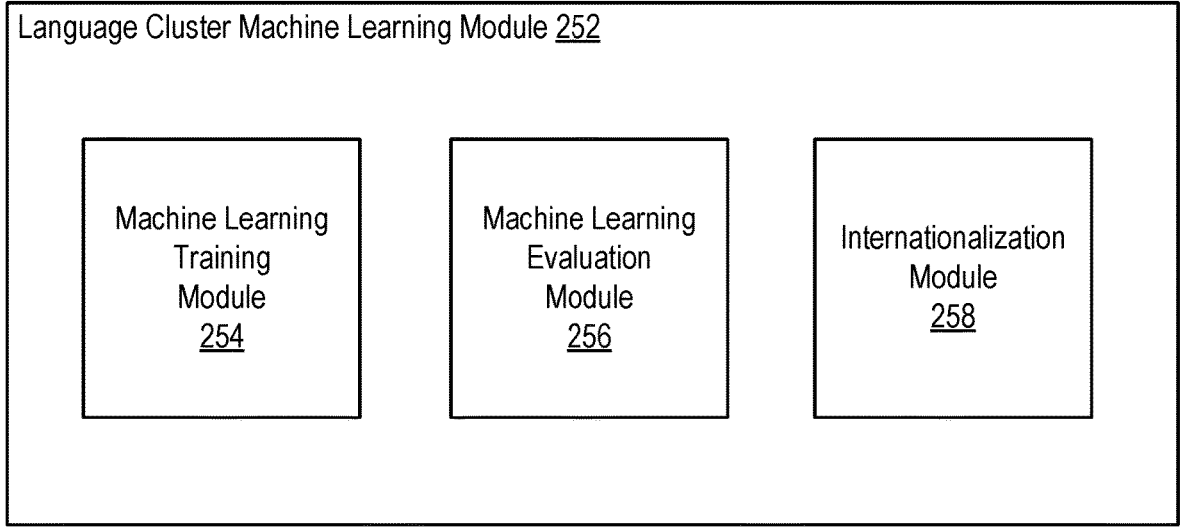
FIG. 2B illustrates an example language cluster machine learning module configured to train machine learning models for language clusters, according to an embodiment of the present technology.

FIG. 2B illustrates an example language cluster machine learning module 252 configured to train machine learning models for language clusters, according to an embodiment of the present technology. In some embodiments, the language cluster machine learning module 106 of FIG. 1 can be implemented with the example language cluster machine learning module 252. As shown in the example of FIG. 2B, the example language cluster machine learning module 252 can include a machine learning training module 254, a machine learning evaluation module 256, and an internationalization module 258. The language cluster machine learning module 252 can train a machine learning model for each language cluster. For example, language clusters can be determined by the language cluster determination module 202, as described above. In some embodiments, the machine learning model can be a neural network, such as a convolutional neural network (CNN).

The machine learning training module 254 can train a machine learning model to determine a classification for a content item in a representative language of a language cluster. A classification for a content item can indicate whether the content item is a particular type of content item. Examples of types of content items can include click bait, engagement bait, etc. Training data for training the machine learning model can include training examples labeled by humans. The training data can include information relating to content items in the representative language and corresponding labels for classifications for the content items in the representative language. For example, a classification for a content item in the representative language in the training data can indicate whether the content item in the representative language is a particular type of content item or not. The training data may also indicate the language associated with the content items (e.g., the representative language).

The training data can include various features. For example, features can relate to content attributes, user attributes, comment attributes, reaction attributes, etc. Content attributes can relate to a content item and can include any attributes associated with content of a content item. Examples of content attributes can include text, an image, a video, an audio, a type of media (e.g., an image, a video, an audio, text, etc.), a subject matter, one or more objects represented in a content item, a duration of a content item (e.g., time length of a video), etc. User attributes can include any attributes associated with users. Users can include authoring users and/or viewing users. An authoring user can refer to a user who creates a content item. A viewing user can refer to a user who views or otherwise consumes a content item. User attributes can relate to any attributes associated with a user of a content item. Examples of user attributes can include a location (e.g., a country, state, county, city, etc.), an age, an age range, a gender, a language, interests (e.g., topics in which a user has expressed interest), a computing device, an operating system (OS) of a computing device, activities, etc. Comment attributes can include any attributes associated with comments created in response to a content item. Reaction attributes can include any attributes associated with reactions selected in response to a content item. For example, a content item can be a post, and a user can create a comment and/or select a reaction in response to the post. Many variations are possible.

The machine learning training module 254 can train the machine learning model to generate a score for a classification. The score associated with a classification can reflect a predicted likelihood that a content item in the representative language falls within the classification. In some embodiments, the machine learning training module 254 can train the machine learning model to generate scores for a plurality of different classifications. The machine learning training module 254 can retrain the machine learning model based on new or updated training data. In some embodiments, the machine learning model can be optimized for languages in the language cluster. For example, the machine learning model can be a neural network, and settings and parameters can be determined to be optimized for the languages in the language cluster. Examples of settings and parameters can include network structure, a number of layers (e.g., hidden layers), a size of a window, etc.

The machine learning evaluation module 256 can apply the trained machine learning model to determine a classification for a content item in the representative language. The trained machine learning model can be applied to feature data relating to a content item in the representative language to determine a classification for the content item. The trained machine learning model can generate a score for a classification. The score associated with a classification can reflect a predicted likelihood that a content item in the representative language falls within the classification. In some instances, the machine learning evaluation module 256 can determine a content item in the representative language to fall within the classification if the score for the classification for the content item in the representative language satisfies a threshold value. In some instances, the machine learning evaluation module 256 can determine a content item in the representative language to not fall within the classification if the score for the classification for the content item in the representative language does not satisfy a threshold value.

The internationalization module 258 can determine a classification for content items in languages in a language cluster other than the representative language. For example, the internationalization module 258 can classify content items in the other languages using the machine learning model trained based on training data in the representative language. As discussed herein, the machine learning model trained based on training data in the representative language can be referred to as the "representative language machine learning model." The internationalization module 258 can use various techniques to leverage machine learning based on the representative language to classify content items in the other languages. As discussed herein, a language in a language cluster that is not a representative language of the language cluster can be referred to as a "cluster language."

In some embodiments, the internationalization module 258 can classify content items in cluster languages based on machine translations of the content items. The internationalization module 258 can apply machine translation to a content item in a cluster language in order to generate a translation of the content item. For example, machine translation can be performed on text of a content item in the cluster language to translate the text from the cluster language to the representative language. The representative language machine learning model can be applied to the translation of the content item in order to determine a classification for the content item.

In some embodiments, the internationalization module 258 can classify content items in a cluster language based on machine translation of the training data in the representative language into the cluster language. For instance, machine translation can be applied to the training data in the representative language to translate the training data into the cluster language. For example, the representative language machine learning model can be further trained based on the machine translated training data in the cluster language to classify content items in the cluster language. As another example, a separate machine learning model may be trained based on the machine translated training data in the cluster language to classify content items in the cluster language. The machine learning model can be trained based on the same or similar features described above. The training data may also indicate the language associated with the content items (e.g., the cluster language).

In some embodiments, the internationalization module 258 can automatically generate training data in a cluster language based on the representative language machine learning model. The internationalization module 258 can apply machine translation to a content item in the cluster language in order to generate a machine translation of the content item into the representative language. The representative language machine learning model can be applied to the machine translation of the content item in order to determine a classification for the content item. The content item in the cluster language and a label corresponding to the classification for the content item as determined by the representative language machine learning model can be included as a training example in the training data for the cluster language. For example, the representative language machine learning model can be further trained based on the automatically generated training data in the cluster language to classify content items in the cluster language. As another example, a separate machine learning model may be trained based on the automatically generated training data in the cluster language to classify content items in the cluster language. The machine learning model can be trained based on the same or similar features described above. The training data may also indicate the language associated with the content items (e.g., the cluster language).

One or more machine learning models discussed in connection with the machine learning internationalization module 102 and its components, such as the language cluster machine learning module 252, can be implemented separately or in combination, for example, as a single machine learning model, as multiple machine learning models, as one or more staged machine learning models, as one or more combined machine learning models, etc. All examples herein are provided for illustrative purposes, and there can be many variations and other possibilities.

Figure 3:
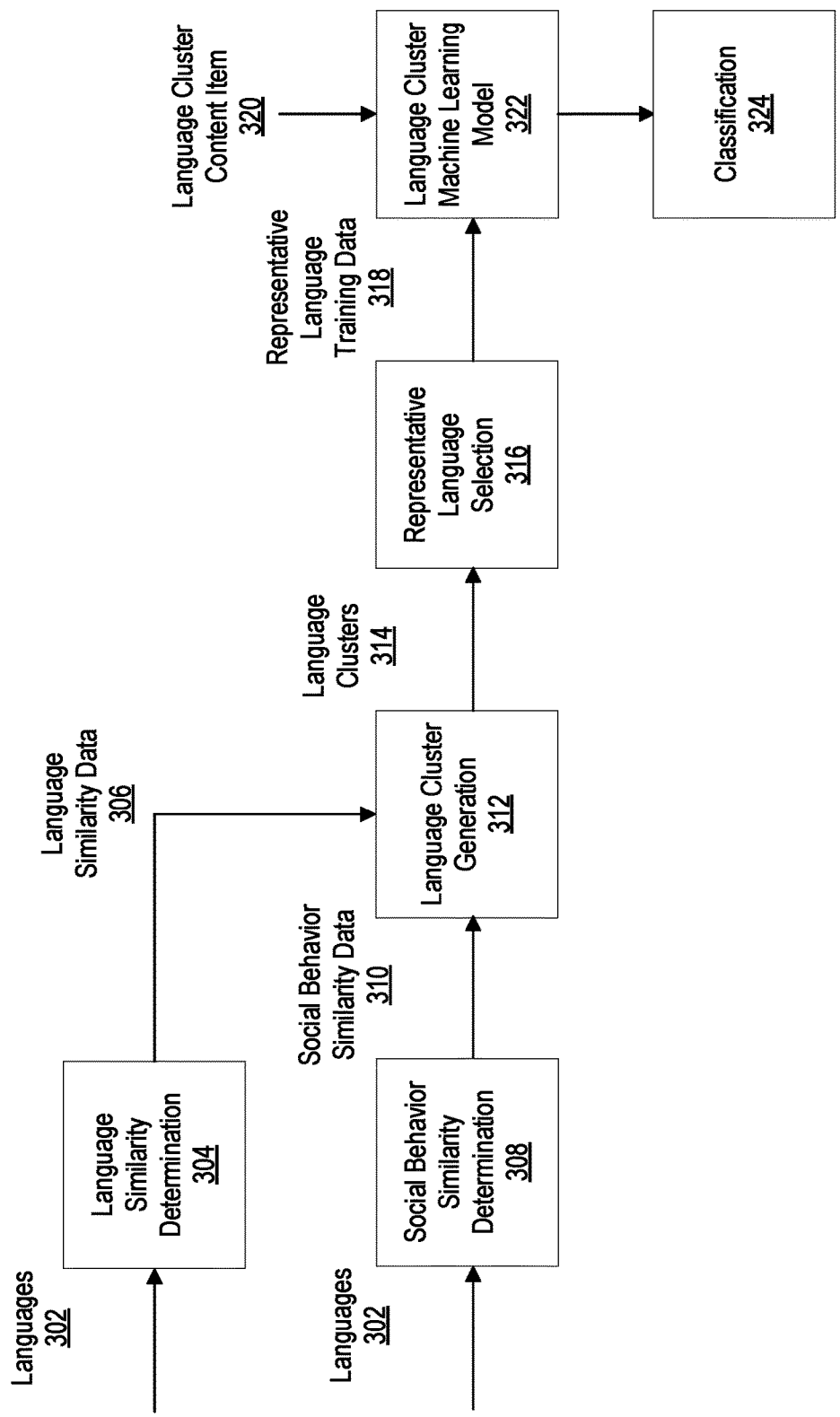
FIG. 3 illustrates an example scenario for training machine learning models for language clusters, according to an embodiment of the present technology.

FIG. 3 illustrates an example scenario 300 for training machine learning models for language clusters, according to an embodiment of the present technology. Operations and functionalities associated with the functional block diagram 300 can be performed by the machine learning internationalization module 102, as discussed herein. At block 304, languages 302 can be analyzed to determine language similarity between or among different languages. For example, language similarity data 306 can be generated at block 304. At block 308, languages 302 can be analyzed to determine social behavior similarity between or among different languages. For example, social behavior similarity data 310 can be generated at block 306. At block 312, language clusters 314 can be generated based on the language similarity data 306 and the social behavior similarity data 310. At block 316, a representative language can be selected for each of the language clusters 314. At block 320, a language cluster machine learning model 322 can be trained for each of the language clusters 314 based on representative language training data 318 for the language cluster. For example, the representative language training data 318 can be prepared in the representative language for the language cluster. The language cluster machine learning model 322 can be trained to classify content items for a particular language cluster of the language clusters 314. For example, various techniques can be used to leverage machine learning for a representative language of the particular language cluster to classify content items in cluster languages in the particular language cluster, as described above. A language cluster content item 320 that is in a language associated with a language cluster can be provided as an input to the language cluster machine learning model 322 for the language cluster. As an example, machine translation can be applied to the language cluster content item 320 to generate a translation of the language cluster content item 320 into the representative language, and the translation of the language cluster content item 320 can be provided as an input to the language cluster machine learning model 322. The language cluster machine learning model 322 can determine and output a classification 324 for the language cluster content item 320. All examples herein are provided for illustrative purposes, and there can be many variations and other possibilities.

FIG. 4 illustrates an example first method 400 for training machine learning models for language clusters, according to an embodiment of the present technology. It should be understood that there can be additional, fewer, or alternative steps performed in similar or alternative orders, or in parallel, based on the various features and embodiments discussed herein unless otherwise stated.

At block 402, the example method 400 can generate a plurality of language clusters based on one or more of: language similarity between languages or social behavior similarity between languages. At block 404, the example method 400 can determine a representative language for a language cluster of the plurality of language clusters. At block 406, the example method 400 can train, for the language cluster of the plurality of language clusters, a machine learning model based on the representative language for the language cluster to classify content items in languages included in the language cluster. Other suitable techniques that incorporate various features and embodiments of the present technology are possible.

Figure 5:
FIG. 5 illustrates an example second method for training machine learning models for language clusters, according to an embodiment of the present technology.

FIG. 5 illustrates an example second method 500 for training machine learning models for language clusters, according to an embodiment of the present technology. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can obtain a content item in a language associated with a language cluster of a plurality of language clusters, wherein the language is not a representative language of the language cluster. At block 504, the example method 500 can determine a classification for the content item based on a machine learning model for the language cluster. Other suitable techniques that incorporate various features and embodiments of the present technology are possible.

It is contemplated that there can be many other uses, applications, features, possibilities, and/or variations associated with various embodiments of the present technology. For example, users can, in some cases, choose whether or not to opt-in to utilize the present technology. The present technology can, for instance, also ensure that various privacy settings, preferences, and configurations are maintained and can prevent private information from being divulged. In another example, various embodiments of the present technology can learn, improve, and/or be refined over time.

Social Networking System—Example Implementation

Figure 6:
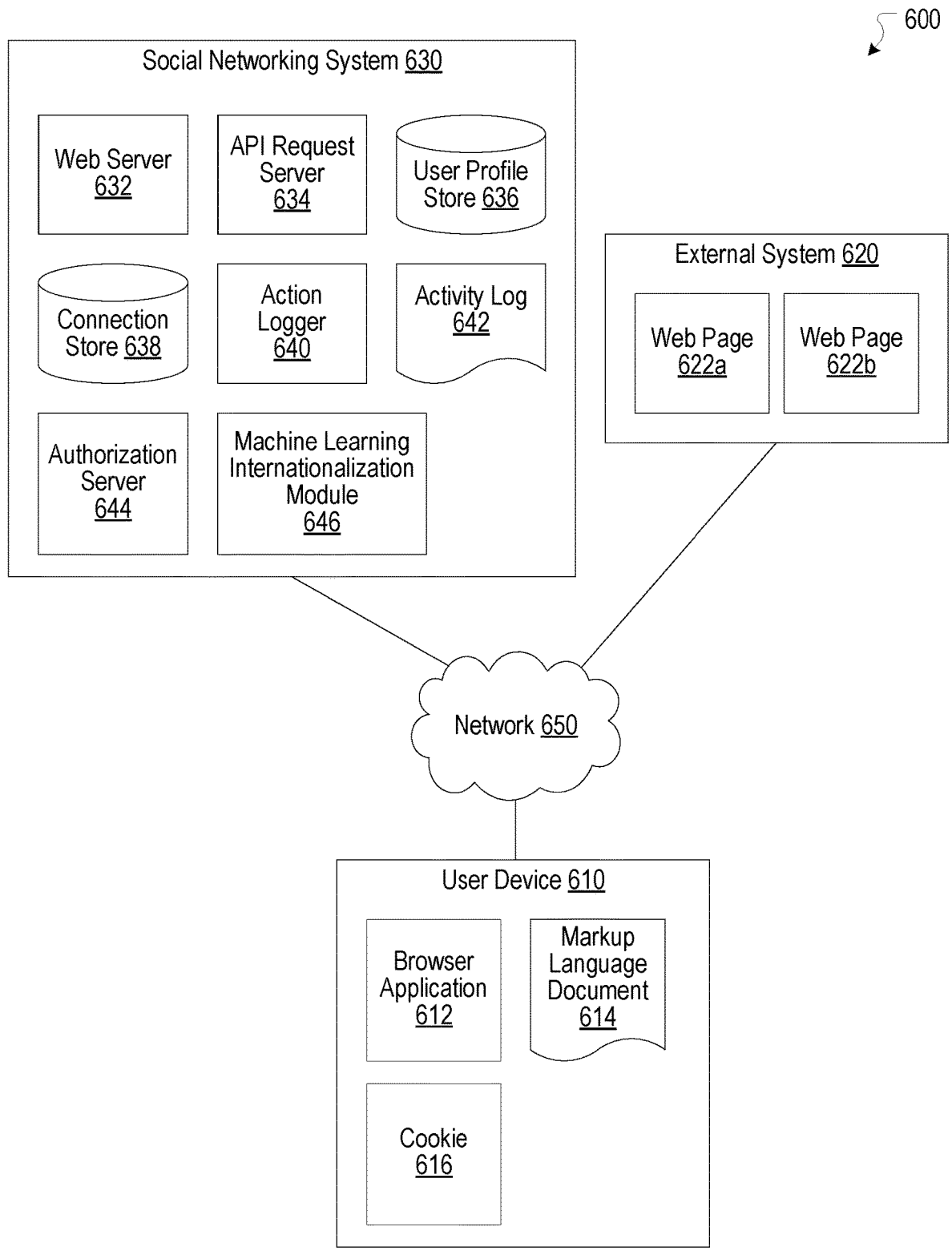
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems

620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a machine learning internationalization module 646. The machine learning internationalization module 646 can be implemented with the machine learning internationalization module 102, as discussed in more detail herein. In some embodiments, one or more functionalities of the machine learning internationalization module 646 can be implemented in the user device 610.

Hardware Implementation

Figure 7:
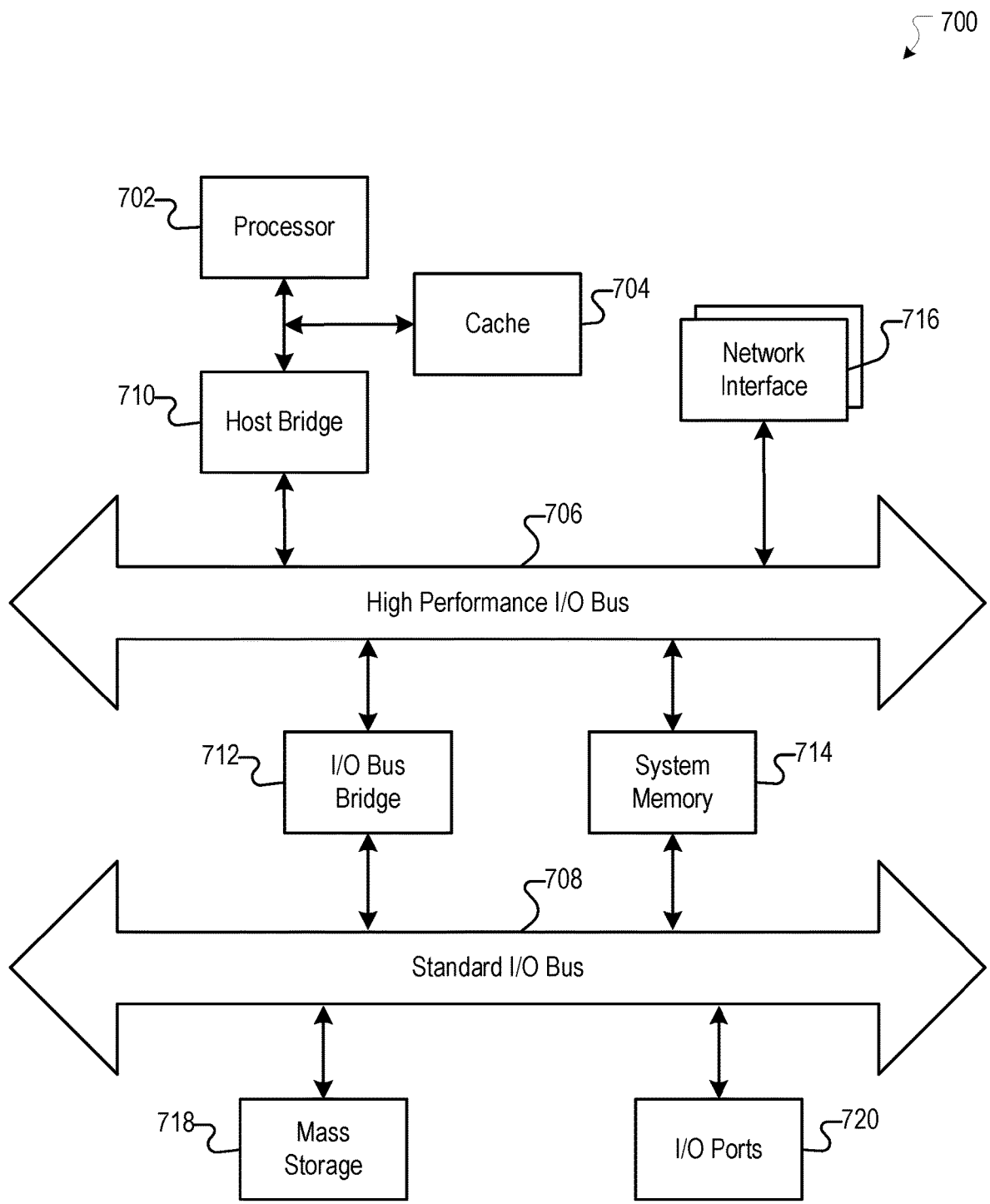
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   generating, by a computing system, a plurality of language clusters, each language cluster comprising a plurality of human languages associated with content items, based on at least one of: language similarity between the plurality of human languages or social behavior similarity between the plurality of human languages;
   determining, by the computing system, a representative language associated with a language cluster of the plurality of language clusters, wherein the representative language is one of the plurality of human languages in the language cluster;
   training, by the computing system, a machine learning model based on the representative language; and
   classifying, by the computing system, a content item associated with a human language, other than the representative language, of the plurality of human languages in the language cluster based at least in part on an application of the machine learning model to a machine translation of text of the content item, wherein the text is machine translated to the representative language.

2. The computer-implemented method of claim 1, wherein the generating of the plurality of language clusters includes determining language similarity between at least a first human language and a second human language based on a quality of machine translation between the first language and the second language.

3. The computer-implemented method of claim 2, wherein the quality of the machine translation is indicated by a score based on a comparison of the machine translation to one or more human reference translations.

4. The computer-implemented method of claim 1, wherein the generating of the plurality of language clusters includes determining social behavior similarity between at least a first human language and a second human language based on one or more features relating to user interactions with content items in the first human language and one or more features relating to user interactions with content items in the second human language.

5. The computer-implemented method of claim 4, wherein the determining of the social behavior similarity between at least the first human language and the second human language includes embedding a feature vector including the one or more features for the first human language and a feature vector including the one or more features for the second human language in a feature space corresponding to the one or more features.

6. The computer-implemented method of claim 4, wherein the one or more features for the first human language and the one or more features for the second human language include one or more of: a number of comments, a number of reactions, a comment through rate, a reaction through rate, or comment entropy.

7. The computer-implemented method of claim 1, wherein the generating of the plurality of language clusters includes determining the plurality of language clusters based on a combination of language similarity between at least a first human language and a second human language and social behavior similarity between at least the first human language and the second human language.

8. The computer-implemented method of claim 1, wherein the generating of the plurality of language clusters includes embedding a feature vector for a first human language and a feature vector for a second human language in a corresponding feature space, the feature vector for the first human language and the feature vector for the second human language including one or more features relating to the language similarity between human languages and the social behavior similarity between human languages.

9. The computer-implemented method of claim 1, wherein training data for training the machine learning model includes a plurality of content items in the representative language and classifications associated with the plurality of content items.

10. The computer-implemented method of claim 1, further comprising:
determining the content item is engagement bait based at least in part on the classifying the content item.

11. A system comprising:
at least one hardware processor; and
a memory storing instructions that, when executed by the at least one processor, cause the system to perform:
generating a plurality of language clusters, each language cluster comprising a plurality of human languages associated with content items, based on at least one of: language similarity between the plurality of human languages or social behavior similarity between the plurality of human languages;
determining a representative language associated with a language cluster of the plurality of language clusters, wherein the representative language is one of the plurality of human languages in the language cluster;
training a machine learning model based on the representative language; and
classifying a content item associated with a human language, other than the representative language, of the plurality of human languages in the language cluster based at least in part on an application of the machine learning model to a machine translation of text of the content item, wherein the text is machine translated to the representative language.

12. The system of claim 11, wherein the generating of the plurality of language clusters includes determining language similarity between at least a first human language and a second human language based on a quality of machine translation between the first human language and the second human language.

13. The system of claim 12, wherein the quality of the machine translation is indicated by a score based on a comparison of the machine translation to one or more human reference translations.

14. The system of claim 11, wherein the generating of the plurality of language clusters includes determining social behavior similarity between at least a first human language and a second human language based on one or more features relating to user interactions with content items in the first human language and one or more features relating to user interactions with content items in the second human language.

15. The system of claim 14, wherein the one or more features for the first human language and the one or more features for the second human language include one or more of: a number of comments, a number of reactions, a comment through rate, a reaction through rate, or comment entropy.

16. A non-transitory computer readable medium including instructions that, when executed by at least one hardware processor of a computing system, cause the computing system to perform a method comprising:
generating a plurality of language clusters, each language cluster comprising a plurality of human languages associated with content items, based on at least one of: language similarity between the plurality of human languages or social behavior similarity between the plurality of human languages;
determining a representative language associated with a language cluster of the plurality of language clusters, wherein the representative language is one of the plurality of human languages in the language cluster;
training a machine learning model based on the representative language; and
classifying a content item associated with a human language, other than the representative language, of the plurality of human languages in the language cluster based at least in part on an application of the machine learning model to a machine translation of text of the content item, wherein the text is machine translated to the representative language.

17. The non-transitory computer readable medium of claim 16, wherein the generating of the plurality of language clusters includes determining language similarity between at least a first human language and a second human language based on a quality of machine translation between the first human language and the second human language.

18. The non-transitory computer readable medium of claim 17, wherein the quality of the machine translation is indicated by a score based on a comparison of the machine translation to one or more human reference translations.

19. The non-transitory computer readable medium of claim 16, wherein the generating of the plurality of language clusters includes determining social behavior similarity between at least a first human language and a second human language based on one or more features relating to user interactions with content items in the first human language and one or more features relating to user interactions with content items in the second human language.

20. The non-transitory computer readable medium of claim 19, wherein the one or more features for the first human language and the one or more features for the second human language include one or more of: a number of comments, a number of reactions, a comment through rate, a reaction through rate, or comment entropy.

* * * * *